(No Model.)

L. RIEGER.
NUT LOCK.

No. 468,420. Patented Feb. 9, 1892.

Witnesses
W. C. Coelies
Geo. S. Prindle

Inventor
Louis Rieger
By his Attys
Hill & Dixon

UNITED STATES PATENT OFFICE.

LOUIS RIEGER, OF CHICAGO, ILLINOIS.

NUT-LOCK.

SPECIFICATION forming part of Letters Patent No. 468,420, dated February 9, 1892.

Application filed September 1, 1890. Serial No. 363,866. (No model.)

*To all whom it may concern:*

Be it known that I, LOUIS RIEGER, a citizen of the United States, residing at Chicago, in the county of Cook and State of Illinois, have invented certain new and useful Improvements in Nut-Locks, of which the following is a specification.

Figure 1:
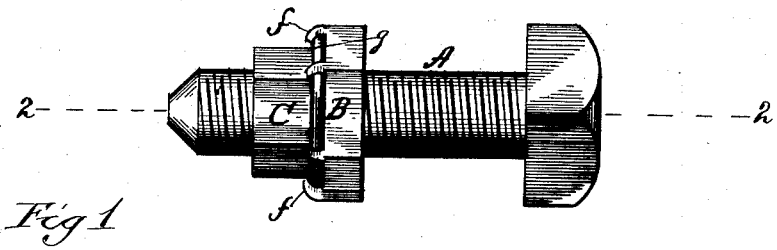
Figure 2:
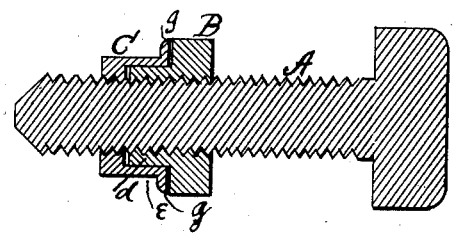
Figure 3:
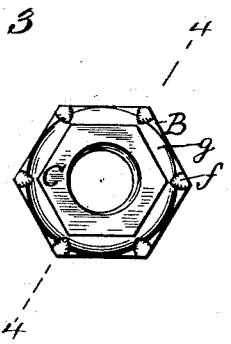
Figure 4:
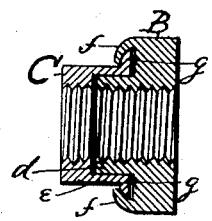

Referring to the accompanying drawings, wherein similar reference-letters indicate like parts, Figure 1 is a side view of the improvement applied to a bolt; Fig. 2, a section in line 2 2 of Fig. 1; Fig. 3, an end view of the nut and lock, and Fig. 4 a section in line 4 4 of Fig. 3.

This improvement relates to that style of nut-locks in which there are two axially-concentric nuts arranged to turn one on the other; and the invention consists in the peculiar construction, arrangement, and combinations of parts hereinafter described and then definitely claimed.

In the drawings, A is the bolt, B the main nut, and C the jam-nut. One of the two nuts (it is immaterial which) is provided with a tubular collar $d$, which fits into a larger tubular collar $e$ on the other nut, so as to hold their axes in line. One of the nuts (it is immaterial which) is also provided with a projection $f$ or series of projections, which are bent over behind an annular shoulder $g$ on the other nut, so as to hold them inseparable while permitting either to turn independently. The two nuts are bored and screw-threaded in the usual manner to fit the bolt with which they are to be used, and are applied as shown in Figs. 1 and 2. The compound nut thus constructed is adapted to be manufactured and sold, complete, as a new article of manufacture. It is applied and removed in the same manner as any other nut, and when the main nut B is in place it is easily locked by turning the jam-nut slightly till the friction stress on the screw-threads holds the whole structure firmly in place, after which it is readily unlocked by reversing the jam-nut. Former details of construction may be varied to suit the taste or judgment of the manufacturer.

Having thus described my invention, what I claim as new, and desire to secure by Letters Patent, is—

1. The combination, in a compound nut, of two nuts permanently secured together, each having a projecting exposed surface adapted to receive a turning-wrench and threaded to fit a bolt, one of said nuts having projections lapping over an annular projection on the other, and the two nuts constructed to turn either together or independently of each other on a bolt at the will of the operator, substantially as described.

2. As a new article of manufacture, the compound nut herein described, consisting of two nuts B and C, permanently secured together, each having a projecting exposed surface adapted to receive a turning-wrench and threaded to fit a bolt, the nut B having a tubular cylindrical projection $d$, fitting in a corresponding recess in the nut C, the projection and recess being in axial line with both openings in the nuts, and projections $f$, lapping over an annular shoulder $g$ on said nut C, and the two nuts constructed to turn either together or independently of each other on a bolt at the will of the operator, all substantially as shown and described, and for the purpose specified.

LOUIS RIEGER.

Witnesses:
 L. HILL,
 CHARLES S. HILL.